United States Patent
Kurihara et al.

(10) Patent No.: US 10,894,320 B2
(45) Date of Patent: Jan. 19, 2021

(54) ROBOT SYSTEM AND ROBOT CONTROL METHOD

(71) Applicant: KABUSHIKI KAISHA YASKAWA DENKI, Kitakyushu (JP)

(72) Inventors: Shoji Kurihara, Kitakyushu (JP); Ken Nakamura, Kitakyushu (JP); Kazutoshi Kobayashi, Kitakyushu (JP); Osamu Matsumoto, Kitakyushu (JP); Yumie Kubota, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 324 days.

(21) Appl. No.: 15/955,702

(22) Filed: Apr. 18, 2018

(65) Prior Publication Data

US 2018/0236656 A1    Aug. 23, 2018

Related U.S. Application Data

(63) Continuation of application No. PCT/JP2015/082630, filed on Nov. 19, 2015.

(51) Int. Cl.
*B25J 9/16* (2006.01)
*B25J 13/00* (2006.01)

(52) U.S. Cl.
CPC ........... *B25J 9/163* (2013.01); *B25J 9/161* (2013.01); *B25J 13/006* (2013.01); *G05B 2219/33192* (2013.01); *Y10S 901/03* (2013.01); *Y10S 901/06* (2013.01)

(58) Field of Classification Search
CPC .......... B25J 9/163; B25J 9/161; B25J 13/006; G05B 2219/33192; Y10S 901/03; Y10S 901/06
See application file for complete search history.

(56) References Cited

U.S. PATENT DOCUMENTS

| | | | |
|---|---|---|---|
| 6,944,542 B1 * | 9/2005 | Eschenbach | G01C 21/165 701/472 |
| 7,043,268 B2 * | 5/2006 | Yukie | H04W 88/06 370/339 |

(Continued)

FOREIGN PATENT DOCUMENTS

| | | |
|---|---|---|
| JP | 2004-148488 | 5/2004 |
| JP | 2006-521714 | 9/2006 |

(Continued)

OTHER PUBLICATIONS https://www.controleng.com/articles/industrial-wireless-bluetooth-can-be-robust-easy-to-use/ (Year: 2013).*

(Continued)

*Primary Examiner* — Nicholas Kiswanto
(74) *Attorney, Agent, or Firm* — Mori & Ward, LLP (57) ABSTRACT

A robot system includes a robot, a control circuit, a first wireless circuit, a second wireless circuit, and a teaching circuit. The first wireless circuit is connected to the control circuit. The teaching circuit is connected to the second wireless circuit to control the robot via the second wireless circuit, the first wireless circuit and the control circuit. The second wireless circuit is configured to transmit a control signal to the first wireless circuit with a first wireless communication scheme using frequency hopping, the robot being configured to be driven or not to be driven according to the control signal, and transmit an information signal to the first wireless circuit with a second wireless communication scheme in which a signal is transmitted in a case where a wireless resource is determined to be available, the information signal relating to driving of the robot.

19 Claims, 8 Drawing Sheets

(56) References Cited

U.S. PATENT DOCUMENTS

| | | | |
|---|---|---|---|
| 7,257,426 B1* | 8/2007 | Witkowski | G07C 5/008 |
| | | | 455/569.2 |
| 7,408,907 B2* | 8/2008 | Diener | H04L 1/1664 |
| | | | 370/338 |
| 9,141,901 B2* | 9/2015 | Thill | G06K 19/0723 |
| 9,425,861 B2 | 8/2016 | Song | |
| 10,064,030 B2* | 8/2018 | Park | H04W 4/16 |
| 2007/0135866 A1* | 6/2007 | Baker | A61B 5/0002 |
| | | | 607/60 |
| 2014/0064601 A1 | 3/2014 | Ramachandran et al. | |
| 2015/0133052 A1* | 5/2015 | Reunamaki | H04W 76/18 |
| | | | 455/41.2 |

FOREIGN PATENT DOCUMENTS

| | | |
|---|---|---|
| JP | 2007-42061 | 2/2007 |
| JP | 2007-188393 | 7/2007 |
| JP | 4842054 B2 | 3/2008 |
| JP | 2008-080474 | 4/2008 |
| JP | 2008-093743 | 4/2008 |
| JP | 2009-038482 | 2/2009 |
| JP | 2011-147004 A | 7/2011 |
| JP | 2014-093567 A | 5/2014 |
| JP | 2014-529210 | 10/2014 |
| JP | 2015-531692 | 11/2015 |
| WO | WO 2004/045092 | 5/2004 |

OTHER PUBLICATIONS

Japanese Office Action for corresponding JP Application No. 2017-551481, dated Nov. 12, 2019 (w/ machine translation).

International Search Report for corresponding International Application No. PCT/JP2015/082630, dated Feb. 9, 2016.

Japanese Office Action for corresponding JP Application No. 2017-551481, dated Apr. 16, 2019 (w/ machine translation).

* cited by examiner

ROBOT SYSTEM AND ROBOT CONTROL METHOD

RELATED APPLICATION

This application is a continuation application of international application PCT/JP2015/082630, filed Nov. 19, 2015, the entire contents of which are incorporated herein by reference.

FIELD

The present disclosure relates to a robot system and a robot control method.

BACKGROUND

Conventionally, a robot system is known that includes a robot, a controller to control the robot, and a teaching device (teaching pendant) to control the robot via the controller.

SUMMARY

In the conventional robot system, various signals such as a control signal related to on and off of the robot and an information signal are transmitted from the teaching device to the controller. However, in the conventional robot system, there has been a problem that the optimal transmission method of the various signals is not considered.

Accordingly, the present disclosure discloses a robot system and a robot control method capable of optimally transmitting the various signals such as the control signal and the information signal from the teaching device to the controller.

A robot system according to a first aspect of the present disclosure includes a robot, a control circuit, a first wireless circuit, a second wireless circuit, and a teaching circuit. The control circuit is configured to control the robot. The first wireless circuit is connected to the control circuit. The second wireless circuit is configured to communicate with the first wireless circuit wirelessly. The teaching circuit is connected to the second wireless circuit to control the robot via the second wireless circuit, the first wireless circuit and the control circuit. The second wireless circuit is configured to transmit a control signal to the first wireless circuit with a first wireless communication scheme using frequency hopping, the robot being configured to be driven or not to be driven according to the control signal, and transmit an information signal to the first wireless circuit with a second wireless communication scheme in which a signal is transmitted in a case where a wireless resource is determined to be available, the information signal relating to driving of the robot.

A robot control method according to a second aspect of the present disclosure includes establishing both a connection of a first wireless communication scheme and a connection of a second wireless communication scheme, the first wireless communication scheme using frequency hopping between a first wireless device and a second wireless device in the robot system in a case where the second wireless device transmits a signal to the first wireless device via short-range communication, a signal being transmitted in a case where a wireless resource is determined to be available in the second wireless communication scheme, the first wireless device connecting to a controller provided in the robot system and configured to control the robot, the second wireless device connecting to a teaching device provided in the robot system and configured to control the robot via the second wireless device, the first wireless device, and the controller. The method includes transmitting, by the second wireless device, a control signal to the first wireless device via the connection of the first wireless communication scheme, the robot being configured to be driven or not to be driven according to the control signal. The method includes transmitting, by the second wireless device, an information signal relating to driving of the robot to the first wireless device via the connection of the second wireless communication scheme.

According to the present disclosure, it is possible to provide the robot system and the robot control method capable of optimally transmitting the various signals such as the control signal and the information signal from the teaching device to the controller.

DESCRIPTION OF EMBODIMENTS

Hereinafter, one embodiment will be described with reference to FIGS. 1 to 8.

<Robot System>

Figure 1:
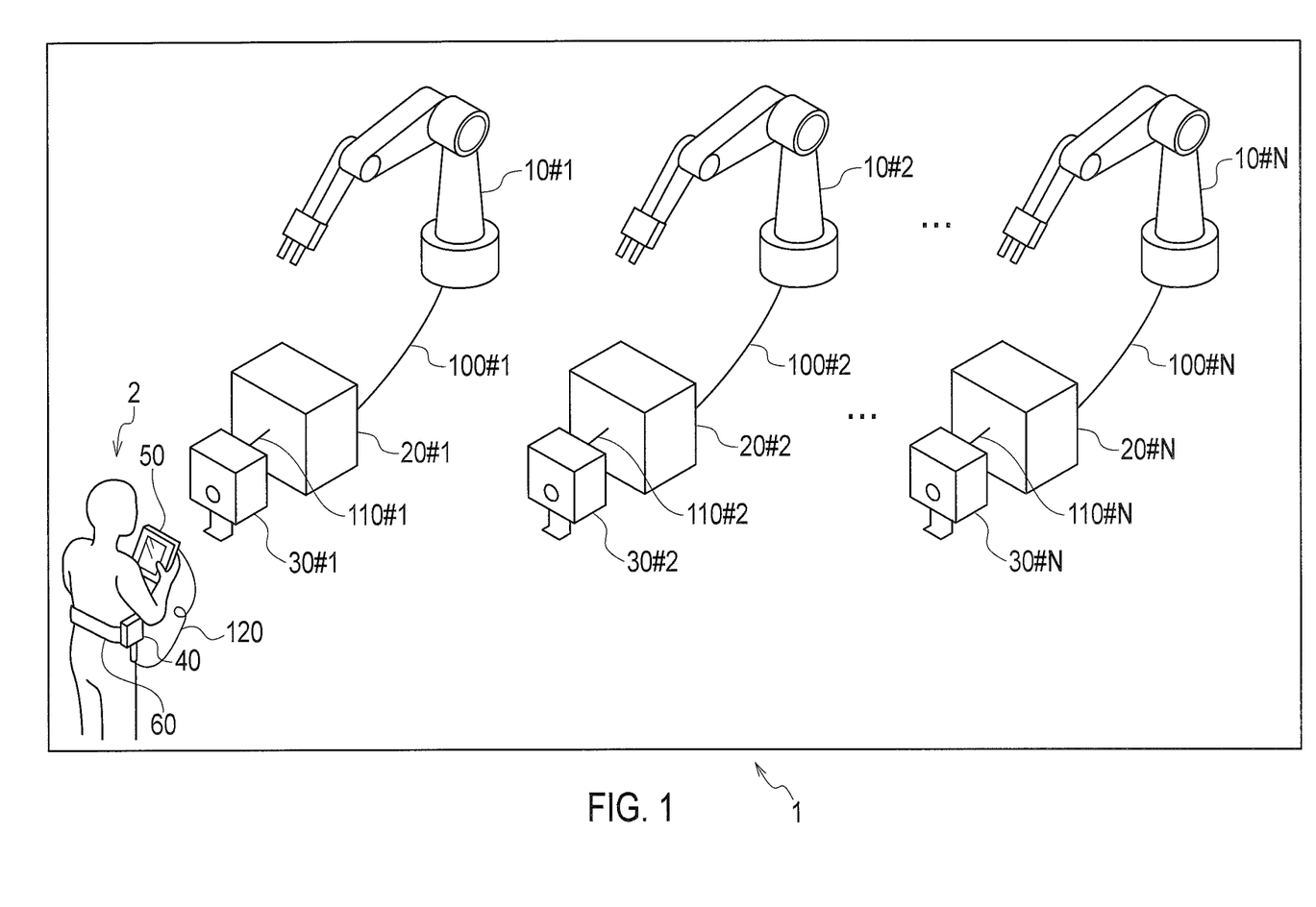
FIG. 1 is a diagram for describing an example of an overall schematic configuration of a robot system according to an embodiment.

First, a robot system 1 according to the present embodiment will be described with reference to FIGS. 1 to 6. As illustrated in FIG. 1, the robot system 1 according to the present embodiment includes a plurality of robots 10 #n, a plurality of controllers 20 #n, a plurality of first wireless devices 30 #n, a second wireless device 40, a teaching device 50, and a belt 60. Here, n is an arbitrary integer in a range of 1 to N.

It is assumed that the robot system 1 according to the present embodiment is configured such that the number of robots 10, the number of controllers 20, and the number of first wireless devices 30 are identical to each other, and the robot 10 #n, the controller 20 #n, and the first wireless device 30 #n having the same integer after "#" in the reference sign correspond to each other. Note that, the present disclosure is not limited to such a case, and is also applicable to a case where the number of robots 10, the number of controllers 20, and the number of first wireless devices 30 are not identical to each other.

The robot 10 #*n* is configured to incorporate an actuator (for example, servomotor) for driving each joint axis, operate when the actuator is controlled by the controller 20 #*n* corresponding to the robot 10 #*n*, and perform various types of operation. Note that, a form of the robot 10 #*n* may be a vertical articulated type, a horizontal articulated type, or a closed link type.

Each controller 20 #*n* is configured to be connected to the corresponding robot 10 #*n* via a wire 100 #*n* such as a cable and control the robot 10 #*n*. Specifically, each controller 20 #*n* is configured to control operation of the actuator of each joint of the corresponding robot 10 #*n*.

Within the wire 100 #*n*, a power line for supplying drive power to the actuator, a communication line for various sensors provided in association with the actuator for feedback control of the actuator, and the like are incorporated.

Further, each controller 20 #*n* may include an emergency stop switch for emergently stopping the corresponding robot 10 #*n*. In this case, an operator 2 presses the emergency stop switch at the time of emergency, thereby being able to cut off an actuator power source, a control power source, and the like of each joint of the robot 10 #*n* in operation and immediately stop the robot 10 #*n*.

Figure 2:
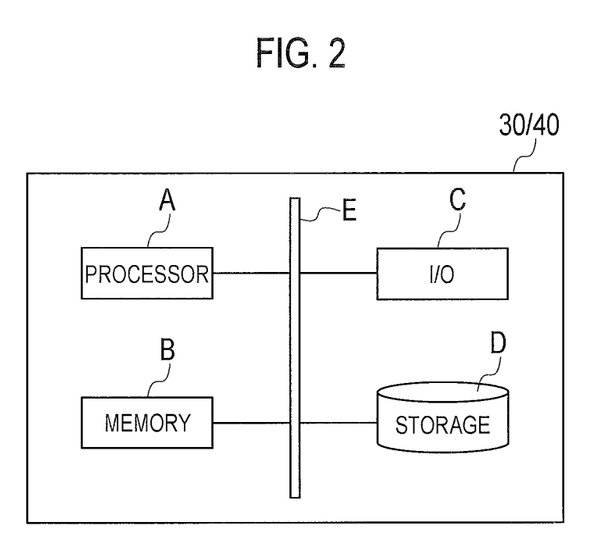
FIG. 2 is a diagram for describing an example of a hardware configuration of a first wireless device and a second wireless device of the robot system according to the embodiment.

Each first wireless device 30 #*n* is connected to the corresponding controller 20 #*n* via a wire 110 #*n*. For example, as illustrated in FIG. 2, the first wireless device 30 #*n* includes a processor A, a memory B, an input/output (I/O) C, a storage D, and a bus E mutually connecting the processor A, memory B, I/O C, and storage D. The processor A executes a program in cooperation with at least one of the memory B and the storage D, and performs input and output of data via the input/output C in accordance with the execution result. As a result, various functions of the first wireless device 30 #*n* are achieved. Note that, the first wireless device 30 #*n* need not include the bus E, and the memory B, the input/output (I/O) C, and the storage D may be directly connected to the processor A. Alternatively, the first wireless device 30 #*n* may be configured to incorporate the processor A, the memory B, the input/output (I/O) C, and the storage D in a one-chip microprocessor.

Figure 3:
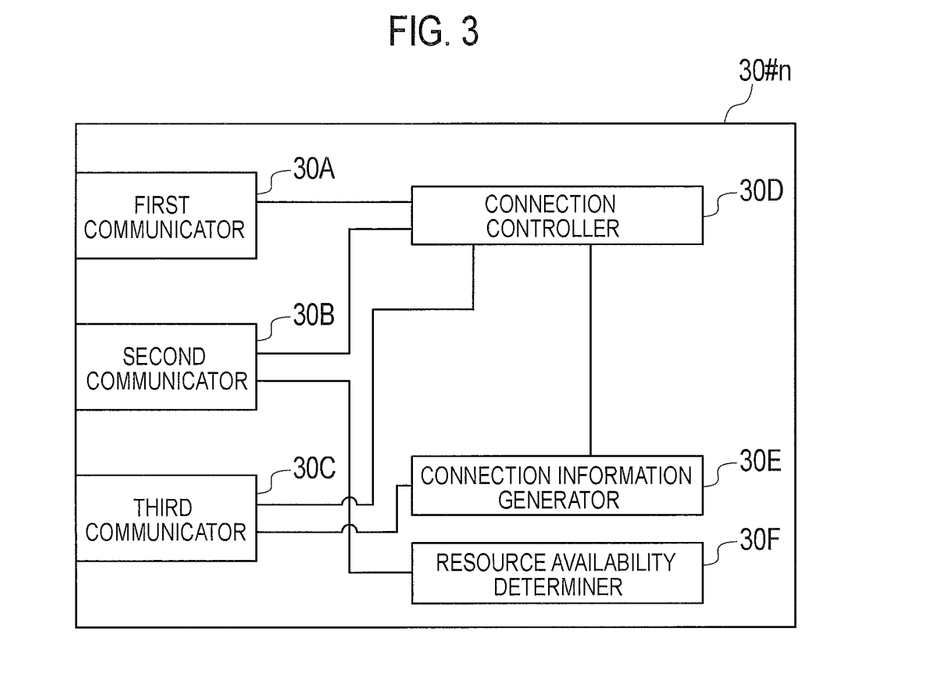
FIG. 3 is a diagram for describing an example of a functional configuration of the first wireless device of the robot system according to the embodiment.

FIG. 3 illustrates those functions as virtual blocks (hereinafter referred to as function blocks). As illustrated in FIG. 3, the first wireless device 30 #*n* includes a first communicator 30A, a second communicator 30B, a third communicator 30C, a connection controller 30D, a connection information generator 30E, and a resource availability determiner 30F.

The first communicator 30A is configured to perform communication using the first wireless communication scheme, the second communicator 30B is configured to perform communication using the second wireless communication scheme, and the third communicator 30C is configured to perform short-range communication.

The connection controller 30D is configured to perform control for connections (a connection of the first wireless communication scheme and a connection of the second wireless communication scheme) between the first wireless device 30 #*n* and the second wireless device 40.

The connection information generator 30E is configured to generate information necessary for establishing the connection of the first wireless communication scheme and the connection of the second wireless communication scheme.

The resource availability determiner 30F is configured to monitor a status of use of resources used in the second wireless communication scheme and determine whether or not a predetermined wireless resource is available.

Here, the first wireless communication scheme is a communication scheme capable of transmitting a signal at an arbitrary timing using frequency hopping. For example, as the first wireless communication scheme, it is possible to use a communication scheme defined in the IEEE 802.15.1 standard, Bluetooth (registered trademark), or the like.

In addition, the second wireless communication scheme is a communication scheme of transmitting a signal in a case where it is determined that the predetermined wireless resource is available, that is, a communication scheme using a "Listen Before Talk (LBT)" technique. Here, the predetermined wireless resource means a time resource (time slot, time frame, or the like) to be used, a frequency resource (frequency band, frequency channel, or the like) to be used, or a code resource (spreading code, channelization code, or the like) to be used. For example, as the second wireless communication scheme, it is possible to use a communication scheme defined in the Wi-Fi (registered trademark) standard or the like.

Specifically, the second communicator 30B is configured to perform communication of the second wireless communication scheme on the basis of a determination result by the resource availability determiner 30F.

Further, the third communicator 30C may be configured to perform communication using an optical communication means, for example, communication using an LED or infrared communication defined in the IrDA (registered trademark) standard or the like, as the above-described short-range communication.

For example, the first communicator 30A is configured to receive a control signal relating to drivability of the robot 10 #*n* from the second wireless device 40 with the above-described first wireless communication scheme. Note that, as the control signal, a signal is assumed generated when an enabling switch, emergency stop switch, deadman switch, or the like to be described later is pressed.

In addition, the second communicator 30B is configured to receive an information signal relating to driving of the robot 10 #*n* from the second wireless device 40, for example, with the above-described second wireless communication scheme.

In addition, the third communicator 30C is configured to receive a predetermined signal to be described later from the second wireless device 40, for example, with short-range communication, and transmit common information to be described later to the second wireless device 40.

The teaching device 50 is configured to be capable of communicating with the first wireless device 30 #*n*. The operator 2 can grasp and operate the teaching device 50. Here, the teaching device 50 is configured to control the robot 10 #*n* corresponding to each controller 20 #*n* in accordance with operation of the operator 2 via each controller 20 #*n*. Note that, the teaching device 50 is also referred to as "Teaching Pendant", "Programing Pendant", or the like.

Specifically, the teaching device 50 includes a plurality of operation keys, a display screen, an enabling switch, and the like, and further includes an emergency stop switch similarly to the controller 20 #*n*. Here, using the display screen as a touch screen, the display screen may be made to have functions equivalent to the operation keys by touching a software key displayed on the screen.

Note that, the teaching device 50 may have a mechanism referred to as a deadman switch. The deadman switch is provided at a position where the operator 2 grasps the teaching device 50 at the time of teaching operation or the like, and has a feature that operation to the teaching device 50 is valid only while the deadman switch is grasped by the operator 2. That is, even in a case where the operator 2 unintentionally presses an operation key, by invalidating the operation based on pressing of the operation key, a risk can be avoided that the robot 10 #*n* suddenly moves or the like.

In the robot system 1 according to the present embodiment, the second wireless device 40 is a separate body from the teaching device 50, and is connected to the teaching device 50 via a wire 120. Note that, the second wireless device 40 may be incorporated in the teaching device 50, may be integrated with the teaching device 50, or may be configured to be detachably attached to the teaching device 50. In addition, the second wireless device 40 is configured to wirelessly relay communication between the first wireless device 30 #*n* and the teaching device 50.

For example, as illustrated in FIG. 2, the second wireless device 40 includes a processor A, a memory B, an input/output (I/O) C, a storage D, and a bus E mutually connecting the processor A, memory B, I/O C, and storage D. The processor A executes a program in cooperation with at least one of the memory B and the storage D, and performs input and output of data via the input/output C in accordance with the execution result. As a result, various functions of the second wireless device 40 are achieved. Note that, the second wireless device 40 need not include the bus E, and the memory B, the input/output (I/O) C, and the storage D may be directly connected to the processor A. Alternatively, the second wireless device 40 may be configured to incorporate the processor A, the memory B, the input/output (I/O) C, and the storage D in a one-chip microprocessor.

Figure 4:
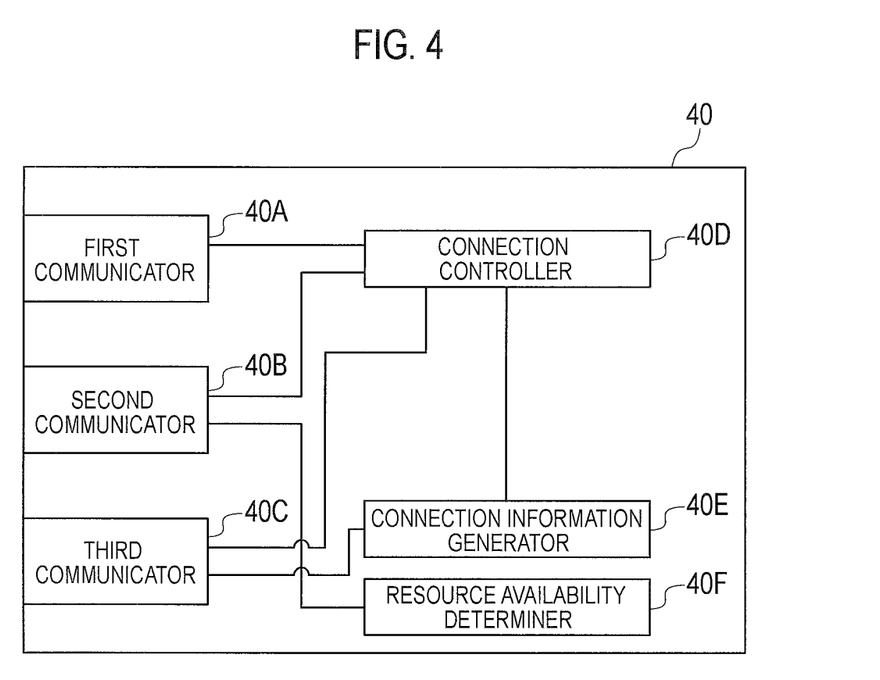
FIG. 4 is a diagram for describing an example of a functional configuration of the second wireless device of the robot system according to the embodiment.

FIG. 4 illustrates those functions as virtual blocks (hereinafter referred to as function blocks). As illustrated in FIG. 4, the second wireless device 40 includes a first communicator 40A, a second communicator 40B, a third communicator 40C, a connection controller 40D, a connection information generator 40E, and a resource availability determiner 40F.

The first communicator 40A is configured to perform communication using the above-described first wireless communication scheme, the second communicator 40B is configured to perform communication using the above-described second wireless communication scheme, and the third communicator 40C is configured to perform the above-described short-range communication.

The connection controller 40D is configured to perform control for connections (the connection of the first wireless communication scheme and the connection of the second wireless communication scheme) between the first wireless device 30 #*n* and the second wireless device 40.

The connection information generator 40E is configured to generate the information necessary for establishing the connection of the first wireless communication scheme and the connection of the second wireless communication scheme.

The resource availability determiner 40F is configured to monitor a status of use of resources used in the second wireless communication scheme and determine whether or not a predetermined wireless resource is available.

Specifically, the second communicator 40B is configured to perform communication of the second wireless communication scheme on the basis of a determination result by the resource availability determiner 40F.

For example, the first communicator 40A is configured to transmit the control signal relating to drivability of the robot 10 #*n* to the first wireless device 30 #*n* with the above-described first wireless communication scheme.

In addition, the second communicator 40B is configured to transmit the information signal relating to driving of the robot 10 #*n* to the first wireless device 30 #*n*, for example, by the above-described second wireless communication scheme.

According to this feature, there is an effect that the second wireless device 40 can appropriately transmit to the first wireless device 30 #*n* a control signal requiring real-time property but having a small amount of information and an information signal having a large amount of information but low requirement for real-time property.

In addition, as described above, the communication scheme defined in the IEEE 802.15.1 standard is used as the first wireless communication scheme, and the communication scheme defined in the Wi-Fi standard is used as the second wireless communication scheme, whereby a required condition can be satisfied for appropriately transmitting the above-described control signal and information signal.

In addition, the third communicator 40C may be configured to perform communication using an optical communication means, for example, communication using an LED or infrared communication defined in the IrDA standard or the like, as the above-described short-range communication. Alternatively, the third communicator 40C may be configured to read a barcode, or may be configured to read an electronic tag such as a Radio Frequency Identifier (RFID) or Felica, or may be configured to read an ID card such as a Felica or SD card (registered trademark).

For example, the third communicator 40C is configured to acquire the common information to be described later from the first wireless device 30 #*n* with the above-described short-range communication, and transmit the predetermined signal to be described later to the first wireless device 30 #*n*.

Further, in a case where the third communicator 40C of the second wireless device 40 transmits the predetermined signal to the first wireless device 30 #*n* via the above-described short-range communication, both new connections of the connection of the first wireless communication scheme and the connection of the second wireless communication scheme may be established between the first wireless device 30 #*n* and the second wireless device 40 by the connection controller 30D of the first wireless device 30 #*n* and the connection controller 40D of the second wireless device 40.

According to this configuration, a connection is established by short-range communication between the second wireless device 40 and the first wireless device 30 #*n*, and then communication is performed via the connection, so that the second wireless device 40 can correctly communicate with the first wireless device 30 #*n* corresponding to the robot 10 #*n* to be controlled.

In addition, according to this feature, there is an effect that, with one trigger, it is possible to establish both connections of the connection of the first wireless communication scheme for transmitting the control signal and the connection of the second wireless communication scheme for transmitting the information signal, and a connection establishment procedure can be simplified.

Alternatively, in the robot system 1 according to the present embodiment, in a case where the predetermined signal is transmitted by the second wireless device 40 as described above, both new connections may be established of the connection of the first wireless communication scheme and the connection of the second wireless communication scheme, after both existing connections are disconnected of the connection of the first wireless communication scheme and the connection of the second wireless communication scheme by the connection controller 30D of the first wireless device 30 #n and the connection controller 40D of the second wireless device 40.

According to this feature, there is an effect that, with one trigger, it is possible to establish both the new connections of the connection of the first wireless communication scheme and the connection of the second wireless communication scheme after disconnecting both the existing connections of the connection of the first wireless communication scheme and the connection of the second wireless communication scheme, and it is possible to establish the new connection while disconnecting the existing connection that is no longer to be used without using a complicated procedure.

In addition, in the robot system 1 according to the present embodiment, the connection of the first wireless communication scheme and the connection of the second wireless communication scheme may be established on the basis of the common information (for example, unique identification information of the first wireless device 30 #n) acquired from the second wireless device 40 via short-range communication by the first wireless device 30 #n. Note that, the unique identification information of the first wireless device 30 #n used for pairing between the first wireless device 30 #n and the second wireless device 40 is stored in the first wireless device 30 #n, and is transmitted to the second wireless device 40 and used.

For example, the connection of the first wireless communication scheme and the connection of the second wireless communication scheme may be established on the basis of a Service Set Identifier (SSID) generated on the basis of the unique identification information of the first wireless device 30 #n.

That is, the connection information generator 30E of the first wireless device 30 #n and the connection information generator 40E of the second wireless device 40 are configured to generate the SSID on the basis of the common information (for example, unique identification information of the first wireless device 30 #n), as the information necessary for establishing the connection of the first wireless communication scheme and the connection of the second wireless communication scheme.

According to this feature, there is an effect that on the basis of the common information (for example, unique identification information of the first wireless device 30 #n) common to the first wireless device 30 #n and the second wireless device 40, the information is generated necessary for establishing the connection of the first wireless communication scheme and the connection of the second wireless communication scheme, whereby a procedure for determining the information can be simplified.

In addition, as illustrated in FIG. 1, in the robot system 1 according to the present embodiment, the belt 60 is for fixing the second wireless device 40 around the waist of the operator 2. Here, an antenna for communicating with the first wireless device 30 #n is provided on the second wireless device 40. The antenna may be incorporated in the second wireless device 40 or may be provided outside the second wireless device 40. Note that, as a shape of the antenna, any shape can be used, such as a linear antenna, a planar antenna, or a plate-like antenna.

As illustrated in FIG. 1, in the robot system 1 according to the present embodiment, arrangement order of the robot 10 #n may be arranged to be identical to arrangement order of the first wireless device 30 #n corresponding to each robot 10 #n.

According to this configuration, there is an effect that the operator 2 can easily recognize the first wireless device 30 #n corresponding to the robot 10 #n to be controlled, and can accurately control the robot 10 #n by using the teaching device 50.

Figure 5:
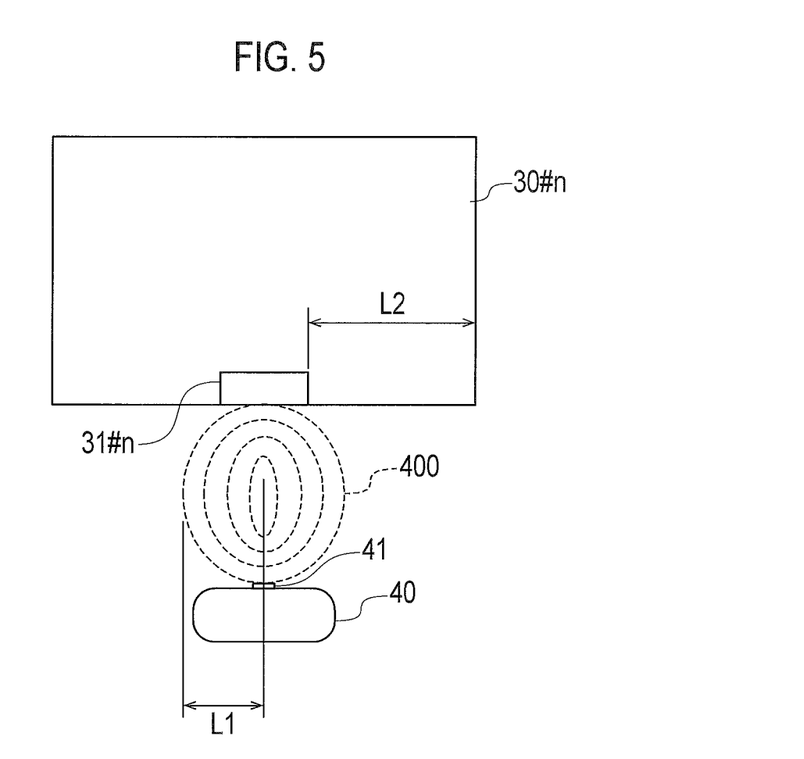
FIG. 5 is a diagram for describing an example of a radiation pattern of a predetermined signal transmitted by the second wireless device of the robot system according to the embodiment.

As illustrated in FIG. 5, in the robot system 1 according to the present embodiment, each first wireless device 30 #n may have a light receiver 31 #n and a light emitter (not illustrated) for the above-described short-range communication, and the second wireless device 40 may have a light receiver (not illustrated) and a light emitter 41 for the above-described short-range communication. That is, bidirectional short-range communication may be performed between each first wireless device 30 #n and the second wireless device 40.

Note that, the light receiver 31 #n may be a part of the third communicator 30C of the first wireless device 30 #n, or may be a separate body from the third communicator 30C of the first wireless device 30 #n. Similarly, the light emitter 41 may be a part of the third communicator 40C of the second wireless device 40, or may be a separate body from the third communicator 40C of the second wireless device 40.

Here, the light emitter 41 of the second wireless device 40 may be configured to transmit the predetermined signal to each first wireless device 30 #n.

Specifically, in a case where the light receiver 31 #n of the first wireless device 30 #n detects the predetermined signal radiated by the light emitter 41 of the second wireless device 40, the third communicator 30C of the first wireless device 30 #n may transmit the unique identification information of the first wireless device 30 #n as the common information to the third communicator 40C of the second wireless device 40.

According to this feature, work can be omitted that the operator 2 manually searches for and selects the unique identification information of the first wireless device 30 #n connected to the controller 20 #n corresponding to the robot 10 #n to be controlled, and it is possible to efficiently establish the connection between the first wireless device 30 #n and the second wireless device 40.

In this case, in the robot system 1 according to the present embodiment, the predetermined signal does not reach each light receiver 31 #n of the two or more first wireless devices 30 #n.

Specifically, in the robot system 1 according to the present embodiment, as illustrated in FIG. 5, a length L1 of a half of the maximum width in a radiation pattern 400 of the predetermined signal may be formed to be shorter than a length L2 between an outer edge of a casing of the first wireless device 30 #n and an outer edge of the light receiver 31 #n.

Note that, in a case of short-range communication using radio waves such as Near Field Communication (NFC) using RFID or the like, the predetermined signal is radiated by the antenna. The radiation pattern 400 varies depending on the shape, position, output, and the like of the antenna provided on the second wireless device 40. Here, the maximum width in the radiation pattern 400 means, for example, a length in a direction orthogonal to the maximum radiation direction in the main lobe of the radiation pattern 400.

For example, in consideration of the above-described distance L2, the shape of the antenna provided on the second wireless device 40, a distance in which short-range communication is assumed to be performed between the first wireless device 30 #n and the second wireless device 40 (for example, 5 cm), or the like, a relationship between the length L1 and the length L2 may be achieved by adjusting output of the predetermined signal or the like.

On the other hand, in a case where optical communication such as the IrDA, LED, or the like is used as the above-described short-range communication, the predetermined signal is transmitted without using the antenna.

According to this feature, there is an effect that the second wireless device 40 can correctly obtain the unique identification information of the desired first wireless device 30 #n. That is, according to this feature, since the predetermined signal radiated by the light emitter 41 of the second wireless device 40 does not reach each light receiver 31 #n of the two or more first wireless devices 30 #n, it is possible to avoid a situation in which the third communicator 40C of the second wireless device 40 receives the unique identification information of the first wireless device 30 #n from each third communicator 30C of the two or more first wireless devices 30 #n, so that a risk can be avoided that control is performed on other than the robot 10 #n to be controlled.

According to this feature, there is an effect that control can be performed such that the predetermined signal radiated having the predetermined radiation pattern 400 by the light emitter 41 of the second wireless device 40 does not reach each of the light receiver 31 #n of the two or more first wireless devices 30 #n.

Figure 6:
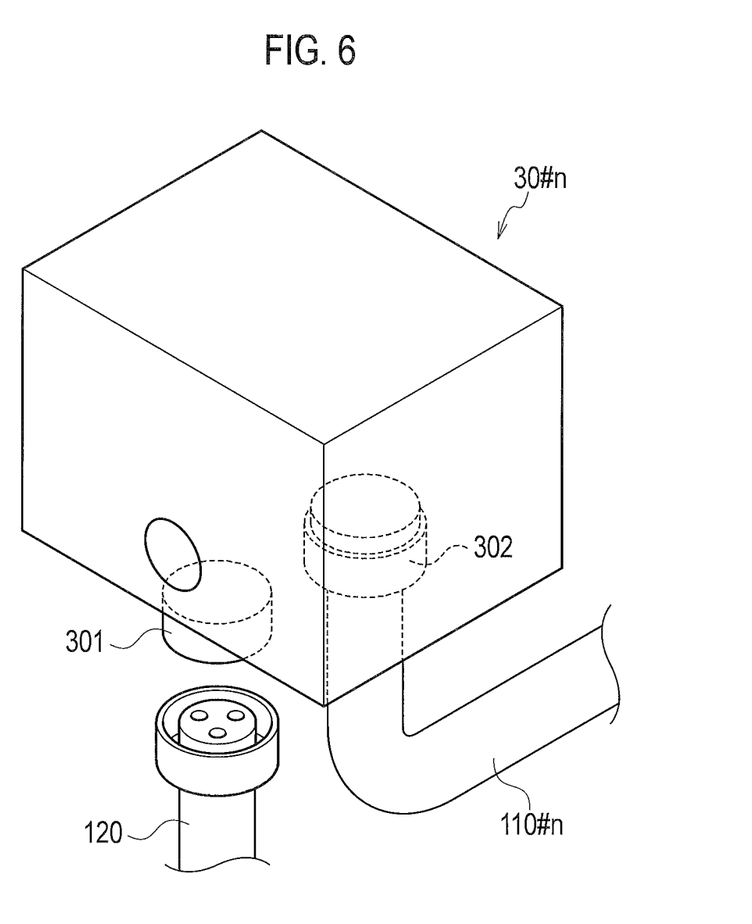
FIG. 6 is a diagram for describing an example of an appearance of the first wireless device of the robot system according to the embodiment.

In addition, in the robot system 1 according to the present embodiment, as illustrated in FIG. 6, the first wireless devices 30 #n may further include a connector 301 connectable to the teaching device 50 via the wire 120, in addition to a connector 302 connectable to the controller 20 #n via the wire 110 #n.

The connector 301 may be provided at an arbitrary position of the first wireless device 30 #n. In addition, the connector 301 may be configured to be connectable to the wire 120 used for connection between the teaching device 50 and the second wireless device 40, or may be configured to be connectable to another wire.

According to this feature, the first wireless device 30 #n can function as a wired repeater between the controller 20 #n and the teaching device 50. Therefore, for example, in a case where the radio wave condition is bad, the controller 20 #n can be connected to the teaching device 50 by a wire without intervention of the second wireless device 40. In this case, even in a case where the controller 20 #n is arranged away from the robot 10 #n as illustrated in FIG. 1 and wireless communication cannot be established between the first wireless device 30 #n and the second wireless device for some reason, the controller 20 #n can be easily and reliably connected to the teaching device 50, so that it is possible to control the desired robot 10 #n.

<Robot Control Method>

Next, with reference to FIGS. 7 and 8, a robot control method according to one embodiment will be described. Hereinafter, with reference to FIG. 7, operation will be described of establishing a connection between the first wireless device 30 #n and the second wireless device 40, and with reference to FIG. 8, operation will be described of releasing the connection between the first wireless device 30 #n and the second wireless device 40.

Figure 7:
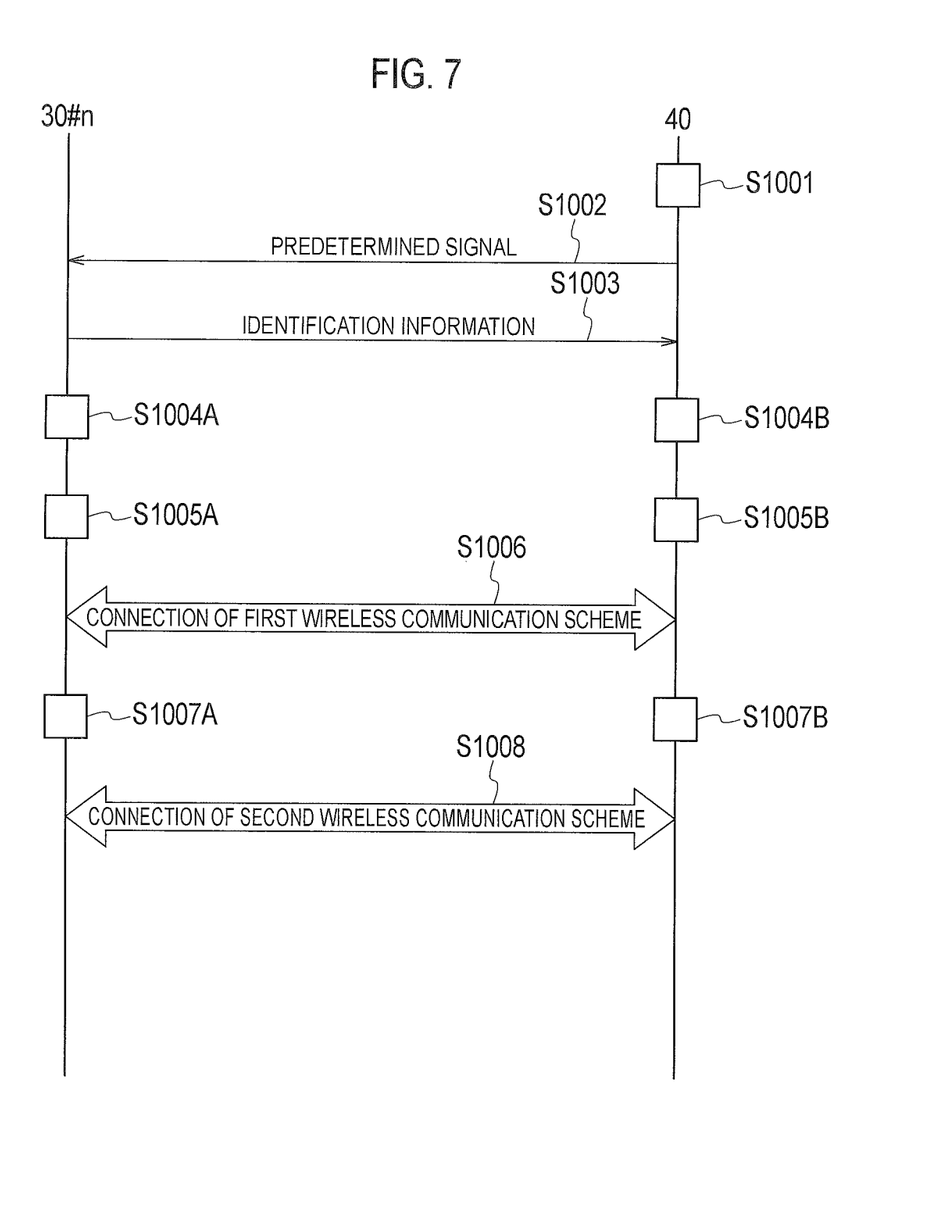
FIG. 7 is a diagram for describing an example of a robot control method according to the embodiment.

As illustrated in FIG. 7, in step S1001, when the operator 2 performs predetermined operation in the second wireless device 40 (for example, pressing a predetermined switch), in step S1002, the light emitter 41 of the second wireless device 40 transmits the predetermined signal having the radiation pattern 400 to the first wireless device 30 #n.

When the light receiver 31 #n of the first wireless device 30 #n detects the predetermined signal in step S1003, the third communicator 30C of the first wireless device 30 #n transmits, to the third communicator 40C of the second wireless device 40, the unique identification information of the first wireless device 30 #n as the common information.

In step S1004A, the connection information generator 30E of the first wireless device 30 #n generates an SSID on the basis of the unique identification information of the first wireless device 30 #n, and in step S1004B, the connection information generator 40E of the second wireless device 40 generates an SSID on the basis of the unique identification information of the first wireless device 30 #n.

In step S1005A, the connection controller 30D of the first wireless device 30 #n performs establishment processing of the connection of the first wireless communication scheme on the basis of the SSID, and in step S1005B, the connection controller 40D of the second wireless device 40 performs establishment processing of the connection of the first wireless communication scheme on the basis of the SSID.

In step S1006, the connection of the first wireless communication scheme is established as a one-to-one wireless communication connection between the first wireless device 30 #n and the second wireless device 40.

Similarly, in step S1007A, the connection controller 30D of the first wireless device 30 #n performs the establishment processing of the connection of the second wireless communication scheme on the basis of the SSID, and in step S1007B, the connection controller 40D of the second wireless device 40 performs establishment processing of the connection of the second wireless communication scheme on the basis of the SSID.

In step S1008, the connection of the second wireless communication scheme is established as a one-to-one wireless communication connection between the first wireless device 30 #n and the second wireless device 40.

Note that, the operation of step S1005A/S1005B/S1006 may be performed after the operation of step S1007A/S1007B/S1008, or may be performed in parallel with the operation of step S1007A/S1007B/S1008.

In addition, according to the operation illustrated in FIG. 7, there is an effect that there is no need to perform communication between the first communicator 30A and the second communicator 30B in the first wireless device 30 #n, and there is no need to perform communication between the first communicator 40A and the second communicator 40B in the second wireless device 40, that is, there is no need to perform communication between communicators that support different wireless communication schemes, so that there is no need to provide a new function for communicating with a communicator of a different wireless communication scheme for an existing communicator.

Figure 8:
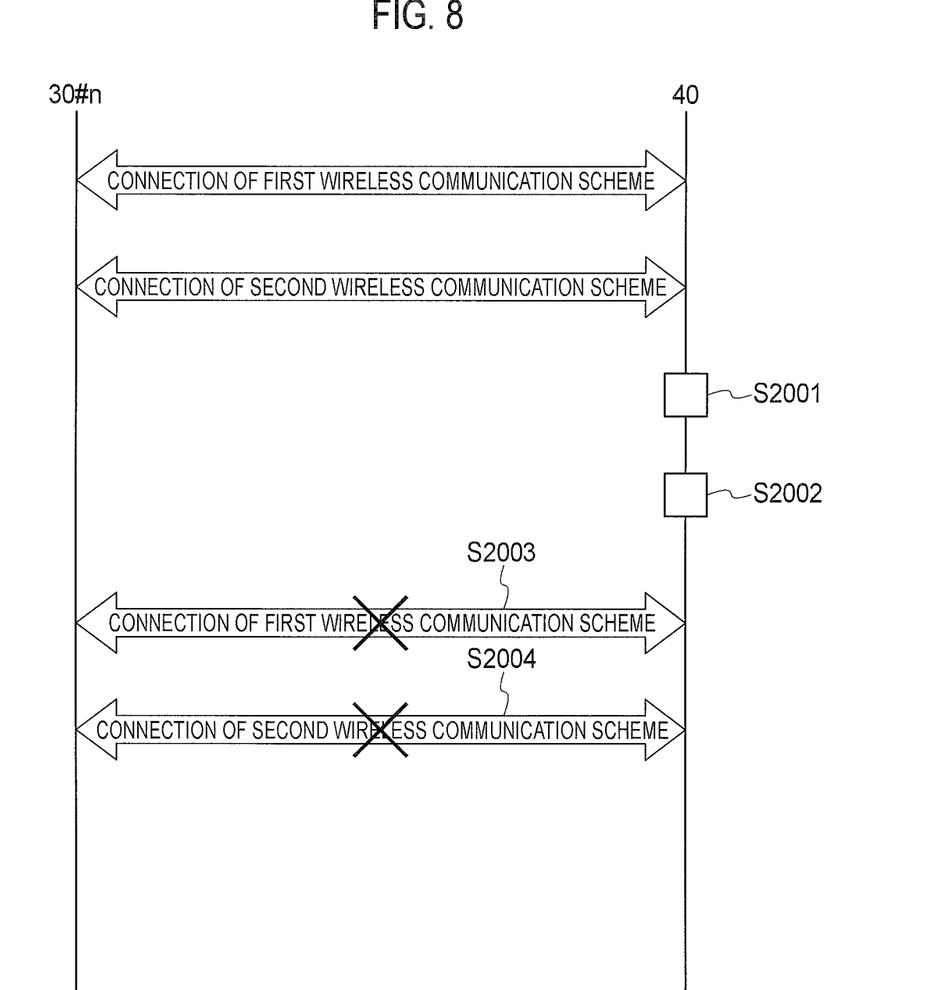
FIG. 8 is a diagram for describing an example of the robot control method according to the embodiment.

As illustrated in FIG. 8, in a situation in which the connection of the first wireless communication scheme and the connection of the second wireless communication scheme are established between the first wireless device 30 #n and the second wireless device 40, in step S2001, when the operator 2 performs predetermined operation in the second wireless device 40 (for example, pressing a predetermined switch, or performing establishment operation of a new connection in the teaching device 50), in step S2002, the connection controller 40D of the second wireless device 40 deletes the held SSID.

Here, in step S2002, the connection controller 40D of the second wireless device 40 may initialize the SSID instead of deleting the held SSID, or may change the SSID to a predetermined value.

As a result, in steps S2003 and S2004, the connection of the first wireless communication scheme and the connection of the second wireless communication scheme cannot be maintained between the first wireless device 30 #n and the second wireless device 40 and are cut off.

According to the operation illustrated in FIG. 8, without performing any special communication between the first wireless device 30 #n and the second wireless device 40, the connection of the first wireless communication scheme and the connection of the second wireless communication scheme can be cut off.

The invention claimed is:

1. A robot system comprising:
   a robot;
   a control circuit configured to control the robot;
   a first wireless communication circuit connected to the control circuit;
   a second wireless communication circuit configured to communicate with the first wireless communication circuit wirelessly;
   a teaching circuit connected to the second wireless communication circuit to control the robot via the second wireless communication circuit, the first wireless communication circuit and the control circuit; and
   the second wireless communication circuit configured to
      transmit a control signal to the first wireless communication circuit with a first wireless communication scheme using frequency hopping, the robot being configured to be driven or not to be driven according to the control signal,
      transmit an information signal to the first wireless communication circuit with a second wireless communication scheme in which a signal is transmitted in a case where a wireless resource is determined to be available, the information signal relating to driving of the robot, and
      perform short-range communication with the first wireless communication circuit such that, when the second wireless communication circuit transmits a short-range communication signal to the first wireless communication circuit via the short-range communication, a connection of the first wireless communication scheme and a connection of the second wireless communication scheme are established between the first wireless communication circuit and the second wireless communication circuit.

2. The robot system according to claim 1, wherein when the signal is transmitted, the connection of the first wireless communication scheme and the connection of the second wireless communication scheme are disconnected, and then the connection of the first wireless communication scheme and the connection of the second wireless communication scheme are established.

3. The robot system according to claim 1, wherein the connection of the first wireless communication scheme and the connection of the second wireless communication scheme are established on the basis of common information acquired from the first wireless communication circuit via the short-range communication by the second wireless communication circuit.

4. The robot system according to claim 1, wherein
   a plurality of the robots is provided,
   a plurality of the first wireless communication circuits that controls the respective plurality of robots is provided, wherein number of the first wireless communication circuits is identical to number of the robots, and
   arrangement order of the robots is arranged to be identical to arrangement order of the first wireless communication circuits corresponding to the respective robots.

5. The robot system according to claim 4, wherein
   the first wireless communication circuits are provided in first wireless communication devices, respectively,
   the second wireless communication circuit is provided in a second wireless communication device,
   each of the first wireless communication devices comprises a light receiver for the short-range communication,
   the second wireless communication device comprises a light emitter to transmit the signal via the short-range communication, and
   each of the first wireless communication devices has a shape such that a length between an outer edge of a casing of each of the first wireless communication devices and an outer edge of the light receiver is longer than a length of a half of a maximum width in a radiation pattern of the signal radiated from the light emitter.

6. The robot system according to claim 1, wherein
   a communication scheme defined in an Institute of Electrical and Electronics Engineers (IEEE) 802.15.1 standard is used as the first wireless communication scheme, and
   a communication scheme defined in a Wireless Fidelity (Wi-Fi) standard is used as the second wireless communication scheme.

7. A first wireless communication device used in the robot system according to claim 1, the first wireless communication device comprising:
   the first wireless communication circuit; and
   a light receiver for the short-range communication, wherein
   a length between an outer edge of a casing of the first wireless communication device and an outer edge of the light receiver is longer than a length of a half of a maximum width in a radiation pattern of a signal radiated for the short-range communication from a light emitter included in the second wireless communication device, the second wireless communication device comprising the second wireless communication circuit.

8. The first wireless communication device according to claim 7, further comprising:
   a connector connectable to a teaching device via a wire, the teaching device including the teaching circuit.

9. The robot system according to claim 1, wherein the control signal includes an emergency signal to cut off power to be supplied to the robot from the controller.

10. The robot system according to claim 1, wherein the control signal includes a deadman signal to stop the driving of the robot.

11. The robot system according to claim 1, wherein an amount of the control signal is smaller than an amount of the information signal.

12. The robot system according to claim 1, wherein the teaching circuit is included in a teaching device that is graspable by an operator.

13. The robot system according to claim 1, further comprising:

a teaching device comprising the teaching circuit and configured to accept an operation by an operator, wherein the teaching device is configured to control the robot in accordance with the operation.

14. A robot control method in a robot system, comprising:

establishing, when a second wireless communication device transmits a short-range communication signal to a first wireless communication device via short-range communication, a connection of a first wireless communication scheme and a connection of a second wireless communication scheme, a signal being transmitted when a wireless resource is determined to be available in the second wireless communication scheme, the first wireless communication scheme using frequency hopping between the first wireless communication device and the second wireless communication device in the robot system, the first wireless communication device being connected to a controller provided in the robot system and configured to control the robot, the second wireless communication device being connected to a teaching device provided in the robot system and configured to control the robot via the second wireless communication device, the first wireless communication device, and the controller;

transmitting, by the second wireless communication device, a control signal to the first wireless communication device via the connection of the first wireless communication scheme, the robot being configured to be driven or not to be driven according to the control signal; and transmitting, by the second wireless communication device, an information signal relating to driving of the robot to the first wireless communication device via the connection of the second wireless communication scheme.

15. The robot system according to claim 1, wherein the second wireless communication circuit is configured to transmit a signal at a timing in the first wireless communication scheme using the frequency hopping.

16. The robot control method according to claim 14, wherein the control signal includes an emergency signal to cut off power to be supplied to the robot from the controller.

17. The robot control method according to claim 14, wherein the control signal includes a deadman signal to stop the driving of the robot.

18. The robot control method according to claim 14, wherein an amount of the control signal is smaller than an amount of the information signal.

19. The robot control method according to claim 14, wherein a signal is to be transmitted at a timing in the first wireless communication scheme using the frequency hopping.

* * * * *